United States Patent
Pesina

(10) Patent No.: US 7,358,849 B1
(45) Date of Patent: Apr. 15, 2008

(54) VEHICLE ANTI-THEFT SYSTEM

(76) Inventor: Ruben E. Pesina, 119 Ricardo, San Antonio, TX (US) 78237

( * ) Notice: Subject to any disclaimer, the term of this patent is extended or adjusted under 35 U.S.C. 154(b) by 286 days.

(21) Appl. No.: 11/165,806

(22) Filed: Jun. 24, 2005

Related U.S. Application Data

(60) Provisional application No. 60/582,839, filed on Jun. 25, 2004.

(51) Int. Cl.
*B60R 25/10* (2006.01)
(52) U.S. Cl. .................. 340/426.17; 340/438
(58) Field of Classification Search ......... 340/426.17, 340/426.13, 426.29, 438, 572.1; 280/33.994
See application file for complete search history.

(56) References Cited

U.S. PATENT DOCUMENTS

| | | | | |
|---|---|---|---|---|
| 6,075,454 A | * | 6/2000 | Yamasaki | 340/5.61 |
| 2001/0035812 A1 | * | 11/2001 | Goetz | 340/5.61 |
| 2002/0024429 A1 | * | 2/2002 | Kamlah | 340/426 |
| 2004/0075541 A1 | * | 4/2004 | Simoneau | 340/426.11 |
| 2005/0184858 A1 | * | 8/2005 | Griffin et al. | 340/426.11 |

* cited by examiner

*Primary Examiner*—Phung T. Nguyen
(74) *Attorney, Agent, or Firm*—Kenneth L Tolar

(57) ABSTRACT

A vehicle anti-theft system includes a microprocessor and associated radio frequency receiver/transmitter installed within a vehicle. The microprocessor is operably connected to the engine control unit and the existing security system. The vehicle transmitter continuously transmits an interrogating signal within a given transmission field. A remote unit includes a transmitter and a receiver that are in discrete communication with the vehicle receiver and transmitter whenever the remote is within the transmission field. If the remote is outside the transmission field and is therefore unresponsive to the interrogating signal, the microprocessor initiates various security measures such as locking doors, disabling the engine and arming the security system. When the remote carrier reenters the transmission field, the interrogating signal triggers an authorized, encoded response from the remote causing the microprocessor to reverse each of the security measures to prepare the vehicle for routine operation.

5 Claims, 1 Drawing Sheet

VEHICLE ANTI-THEFT SYSTEM

CROSS REFERENCE TO RELATED APPLICATIONS

This application is entitled to the benefit of provisional application No. 60/582,839 filed on Jun. 25, 2004.

BACKGROUND OF THE INVENTION

The present invention relates to a uniquely designed vehicle anti-theft system that automatically initiates a series of security measures whenever an authorized person is outside a given range of the vehicle.

DESCRIPTION OF THE PRIOR ART

Various keyless entry devices for vehicles exist in the prior art. Typically, they include a remote/key chain type transmitter having a plurality of function buttons thereon such as a lock button that locks the doors, sets an alarm system and activates various perimetrical sensors; a disarm button unlocks the vehicle doors and deactivates the vehicle sensors while a panic button immediately activates audible and visual alarms. However, in order to operate the device, a user must manually depress a button which is not always possible in darkness or if the remote cannot otherwise be located.

The present invention addresses the inconveniences associated with conventional vehicle security systems by providing a uniquely designed vehicle anti-theft system that includes a remote for activating and deactivating the system. The remote is a discretely coded transceiver that responds to an interrogating signal from the vehicle whenever the remote is within the vehicle's transmission field. When the remote exits the field, the system automatically initiates a series of security measures that render the vehicle inoperable. When the remote re-enters the field, the security measures are reversed.

SUMMARY OF THE INVENTION

The present invention relates to a vehicle anti-theft system. The device comprises a microprocessor, a radio frequency transmitter and a receiver mounted within the vehicle. The transmitter continuously transmits an interrogating signal within a given transmission field surrounding the vehicle. The microprocessor is connected to the engine control unit and the vehicle security system to perform a variety of functions upon receiving a predetermined encoded authorization signal from a remote unit. For example, the microprocessor can lock and unlock doors, actuate a fuel shutoff switch or a vehicle engine disable switch, activate headlights or interior lights, adjust seats and mirrors or otherwise perform a variety of other functions for disabling or enabling the vehicle.

The microprocessor initiates such functions upon receiving an encoded authorization signal from the remote unit. The remote unit is incorporated into any small or compact handheld device and likewise includes a microprocessor, a transmitter and a receiver. Control switches may be positioned on the exterior of the remote unit for manually inducing various functions. When an authorized remote enters the transmission field, it responds by transmitting an encoded password. The vehicle microprocessor verifies the signal and begins unlocking doors, enabling the engine or initiating other various functions associated with preparing the vehicle for operation. Upon the remote carrier exiting the transmission field, the microprocessor reverses the initiated functions and locks the doors, activates the alarm system, disables the engine, etc. thereby disabling the vehicle.

It is therefore an object of the present invention to provide a vehicle anti-theft system that is automatically deactivated when a driver is within a predetermined range of the vehicle.

It is another object of the present invention to provide a vehicle anti-theft system that is automatically activated whenever a driver is outside a predetermined range of the vehicle.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
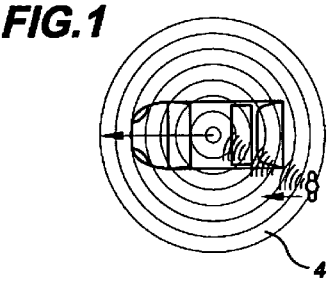
FIG. 1 is a top view of a vehicle depicting an exemplary transmission field of the anti-theft system according to the present invention.
Figure 2:
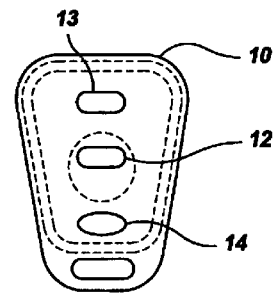
FIG. 2 is a front, plan view of an exemplary remote unit.
Figure 3:
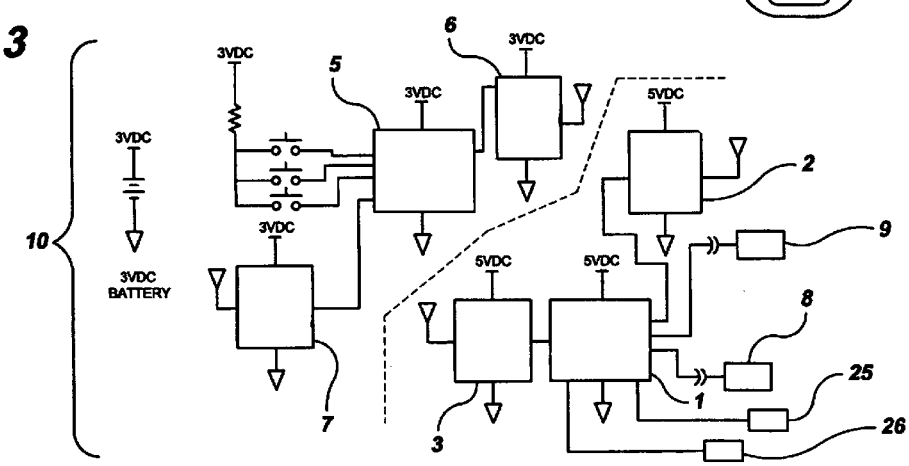
FIG. 3 is a schematic of the various electronic components according to the present invention.

The present invention relates to a vehicle anti-theft system. The device comprises a microprocessor 1, a radio frequency transmitter 2 and a receiver 3 strategically mounted within a vehicle. The transmitter continuously transmits an interrogating signal within a given transmission field 4 surrounding the vehicle. The microprocessor is connected to the engine control unit 8, the engine disable switch 9, the vehicle security system 25, or any other operable accessories 26 associated with the vehicle so as to perform a variety of functions upon receiving a predetermined encoded authorization response signal from a remote unit 10. For example, the microprocessor can initiate locking and unlocking of doors, actuate a fuel shutoff switch or a vehicle engine disable switch, arm the vehicle security system and associated sensors, activate headlights or interior lights, adjust seats and mirrors, lower and raise windows or otherwise perform virtually any other function for disabling, enabling, securing or assisting in the operation of the vehicle.

The microprocessor initiates such functions upon receiving an encoded authorization response signal from the remote unit 10. The remote unit is incorporated into any small or compact handheld devices and likewise includes a microprocessor 5, a transmitter 6 and a receiver 7. Control switches may be positioned on the exterior of the remote unit for manually inducing the various functions. For example, a panic button 14 may be provided for immediately activating alarms associated with the security system such as the horn, lights, etc. A trunk release button 12 for automatically opening the vehicle trunk may also be included. The remote preferably includes a bypass button 13 for temporarily disabling transmission of the interrogating signal when the engine is not operating allowing a user to safely perform maintenance within the passenger compartment, wash the vehicle or perform other tasks that require an open door or trunk.

A cellular phone transmitter can also be included that dials a predetermined phone number if the security system is compromised. If no one answers or responds within a predetermined time period, the cellular transmitter dials an emergency number such as 911.

The above described system operates as follows. When an authorized remote enters the transmission field, it responds by transmitting an encoded password. The vehicle microprocessor receives the signal, verifies the password and begins unlocking doors, enabling the engine or initiating other various activity associated with preparing the vehicle for routine operation. Upon the remote carrier exiting the transmission field, the remote is no longer responsive to the interrogating signal at which time the microprocessor reverses the initiated activities and locks the doors, disables the engine, activates the security system, etc. thereby disabling the vehicle.

The above described device is not limited to the exact details of construction and enumeration of parts provided herein. For example, though the remote is depicted as a compact, key ring type device, the pertinent components thereof can be incorporated into a watch, ID card, tie clip or any other similar item. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A vehicle anti-theft system comprising:
    a wireless transmission means mounted within a vehicle for continuously transmitting a discrete coded wireless interrogating signal within a predefined transmission field surrounding a vehicle;
    a remote means in discrete wireless communication with said transmission means when said remote means is within the predefined transmission field;
    a security means for automatically initiating a vehicle security measure whenever said remote means is outside the predefined transmission field, wherein said security means includes a microprocessor in communication with the transmission means, a receiver and a vehicle operation control device, said transmission means transmitting the continuous interrogation signal within the predefined field to trigger an authorized response signal from said remote means to place said control device in a first state associated with routine vehicle operation, whereupon said remote means being outside said transmission field results in absence of said authorized response signal causing said microprocessor to place said control device in a second state associated with vehicle disablement;
    a bypass means for temporarily disabling transmission of the interrogating signal allowing a user to safely perform maintenance without affecting a status of said control device.

2. The vehicle anti-theft system according to claim 1 wherein the control device is a vehicle security system with associated alarms whereby said system is armed upon said remote being outside the predefined transmission field.

3. The vehicle anti-theft system according to claim 2 wherein said remote means further comprises a panic means for immediately activating said vehicle security system with associated alarms.

4. The vehicle anti-theft system according to claim 1 wherein the control device is a vehicle engine disabling means for disabling an engine upon said remote being outside the predefined transmission field.

5. The vehicle anti-theft system according to claim 1 wherein the control device is any one of a plurality of powered vehicle accessories associated wilt vehicle operation that are enabled upon said remote means entering the transmission field.

* * * * *